Figure 1:
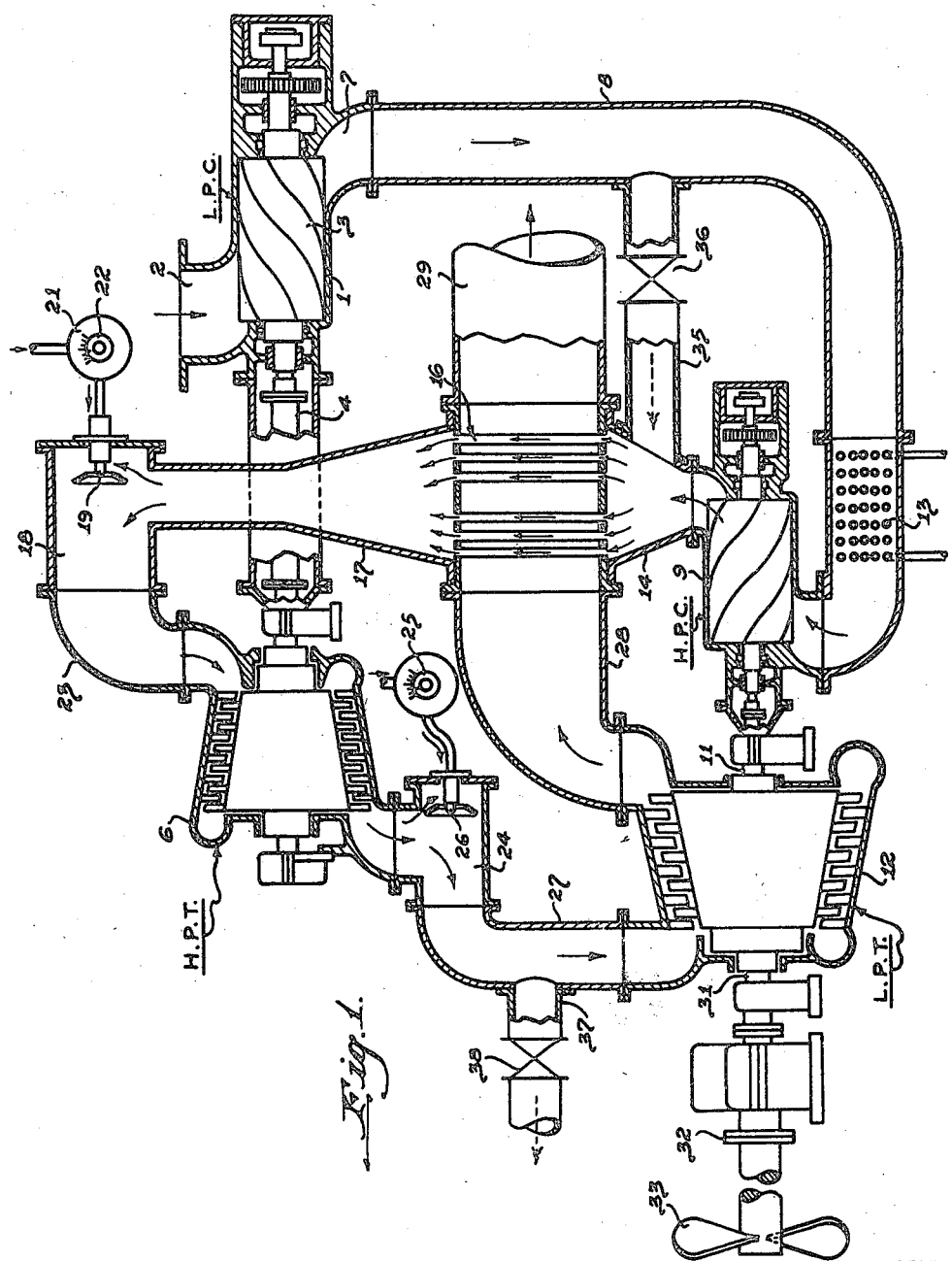

Patented Apr. 15, 1947

2,418,911

UNITED STATES PATENT OFFICE 2,418,911

GAS TURBINE CYCLE

Ronald B. Smith, Greensburg, Pa., assignor to Elliott Company, Jeannette, Pa., a corporation of Pennsylvania Application April 28, 1944, Serial No. 533,190

8 Claims. (Cl. 60—41)

This invention relates to continuous combustion gas turbine plants and their operating cycles, and more particularly to those on which there are variable load requirements.

The power developed by any gas turbine plant depends upon the product of the weight of air flowing through it, the heat drop of that air, and the efficiency of the machinery. Therefore, one may obtain part load performance by varying any one or more of these three conditions. As it is obvious that to achieve an efficient cycle the efficiency of the machinery must be maintained as high as possible at all loads, the only two economical ways left for obtaining part load performance are to vary the air flow, or the heat drop through controlling the temperature. With efficient machinery, the most efficient gas turbine plant that can be designed is one which, under varying loads, maintains the temperature before all of its turbines as high and as constant as possible. Nevertheless, prior gas turbine plants, by virtue of the design of their cycles or their components, have been controlled essentially by variation of temperature before the turbines. Thus, when the burners have been turned up or down in order to change the power output of the plant, the temperature of the air has changed because the quantity of air pumped through the system has either remained nearly constant or has not varied in substantially the same relation as the number of B. t. u.'s supplied by the burners. It is well known that in plants controlled by varying the temperature the efficiency falls almost directly with the load. Furthermore, such plants are difficult to control in the first place, and require complex regulating equipment.

It is among the objects of this invention to provide a continuous combustion gas turbine cycle which operates throughout its load range at substantially constant temperature before the turbines, which has a substantially flat efficiency curve under varying load conditions, which is economical, which is simple to control, and which does not require a complicated system of valves and regulating equipment to make it operative.

In accordance with this invention, air is compressed in a plurality of successive stages by means of two or more compressors arranged in series. The compressed air is heated to a high temperature and then it is expanded in a plurality of successive turbines to produce power. The power thus produced in a turbine other than the low pressure turbine is used to drive the low pressure compressor, while the compressor or compressors subsequent to the first one are operated by means of part of the power produced by the turbine or turbines other than the one driving the low pressure compressor. This leaves an excess of power which is available for useful work outside of the plant, such as for driving a propeller or other apparatus. The system may be provided with the usual heat exchanger beyond the low pressure turbine, and with one or more intercoolers between the compressors. The compressed air is heated before each turbine, preferably by passing it through a combustion chamber in which a fluid fuel is burned continuously. When only two compressors and two turbines are used, the low pressure compressor is driven by the high pressure turbine, and the high pressure compressor is operated by the low pressure turbine. As it does not require all of the power produced by the low pressure turbine to drive the high pressure compressor, the remaining power can be used in any way desired.

The amount of power available at the coupling of the power output turbine is regulated in accordance with load requirements by varying the quantity of air flowing through the cycle while maintaining the temperature of that air before the turbines so nearly constant that practically flat efficiency curve is obtained for the cycle over at least two-thirds of its operating range. The quantity of air is varied by altering the speed of the low pressure compressor, which is done by controlling the supply of fuel injected into the combustion chamber immediately ahead of the turbine driving the low pressure compressor. In this cycle the air flow varies in substantially linear relation to changes in the amount of heat applied to it, so that the temperature of the compressed air at the turbines remains substantially constant whether the air flow is increased or decreased. By "substantially constant temperature" and "substantially linear relation" I mean a temperature or relation that varies so little that the full load efficiency of the cycle does not change materially with a drop in load.

Figure 2:
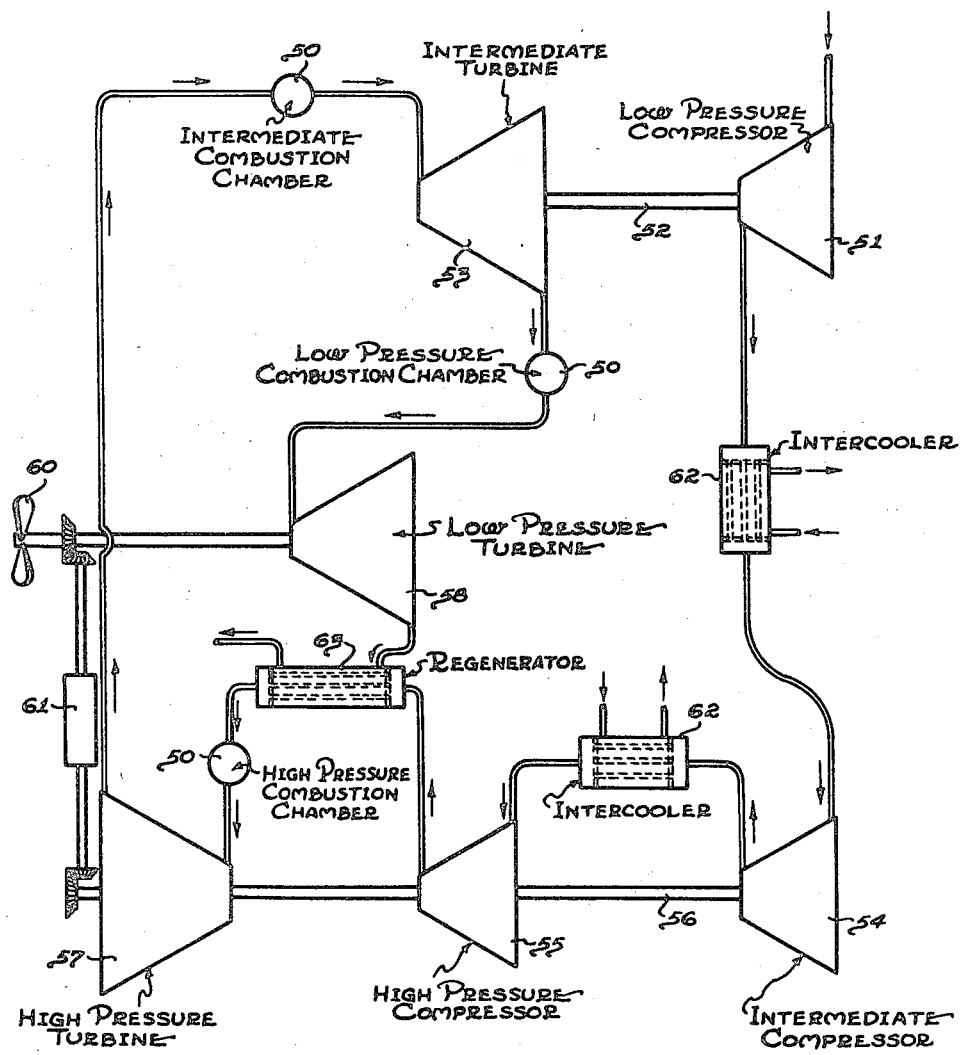

The invention is illustrated diagrammatically in the accompanying drawings in which Fig. 1 represents a two-turbine plant and Fig. 2 a three-turbine plant.

Referring to Fig. 1 of the drawings, a low pressure compressor 1 has an inlet 2 that opens to the atmosphere. This compressor may be of any type, but most suitably is a positive displacement compressor of the rotary axial flow type constructed like the highly efficient and well-known Lysholm compressor. Such a compressor includes a pair of parallel rotors geared together so that one drives the other. The rotors are provided with intermeshing helical lobes and recesses which draw in air and compress it as it passes through the machine. One of the rotors 3 of the illustrated compressor is driven through a shaft 4 from a high pressure turbine 6, preferably of the axial flow reaction type. The outlet 7 of the compressor is connected by a conduit 8 to the inlet of another compressor 9. This second compressor, which is the high pressure compressor of the system, is driven by a shaft 11 projecting from one end of a low pressure turbine 12. Between the two compressors there is the usual intercooler 13 for removing from the compressed air some of the heat of compression.

The outlet of the high pressure compressor is connected by a short conduit 14 to the low temperature passage through a heat exchanger 16 the outlet of which is connected by a conduit 17 to the side of a cylindrical high pressure combustion chamber 18 near one end. Mounted in this end of the chamber is a nozzle or burner 19 for supplying a fluid fuel, such as oil, to the chamber. The oil is supplied to the burner through a variable quantity controller, preferably a multi-cylinder Diesel injection pump 21 connected to a supply tank (not shown). When a Diesel pump is used, the charges of oil supplied to the burner by the different cylinders of the pump are injected so close together that a continuous fire is maintained in the combustion chamber. The pump is provided with a manually or automatically operated control 22 for regulating the quantity of oil supplied to the burner per minute. The combustion chamber end opposite the burner is open and is connected by a conduit 23 to the inlet of high pressure turbine 6.

The outlet of the high pressure turbine is connected to another combustion chamber 24 of the type just described and which likewise has a fuel pump control 25 for regulating the quantity of fuel supplied to its burner 26 per minute. The outlet of this low pressure combustion chamber is connected by a conduit 27 to the inlet of low pressure turbine 12, and the outlet of the turbine is connected by a conduit 28 to the high temperature passage through the heat exchanger. This passage opens to the atmosphere through a conduit 29. The end of the low pressure turbine opposite to high pressure compressor 9 is provided with a drive shaft 31 and a coupling 32 for driving a propeller 33 or any other equipment or device that is to be operated by this plant.

It will be observed that compressor conduits 8 and 14 are connected by a by-pass conduit 35 in which there is a valve 36. Also, the conduit 27 between low pressure combustion chamber 24 and the low pressure turbine is provided with a by-pass 37 to atmosphere in which there likewise is a valve 38. These two valves are open only while the plant is being started in operation, except in the case of extremely light loads, when valve 38 may be opened part way to by-pass some of the fluid.

At starting, valve 36 is opened to by-pass compressed air from the low pressure compressor around the high pressure compressor, and valve 38 is opened to discharge the exhaust from the high pressure turbine to the atmosphere before it can reach the low pressure turbine. The high pressure turbine 6 is set in motion initially by means of an auxiliary power unit, such as an electric motor (not shown), and the turbine drives the low pressure compressor which thereupon starts to pump compressed air into the system and through by-pass conduit 35. This air, which is heated in high pressure combustion chamber 18 to a high temperature, helps drive the high pressure turbine. As soon as the air flow becomes sufficient to operate the high pressure turbine without assistance, the starting motor is disconnected from the turbine. The supply of fuel to the high pressure combustion chamber is steadily increased by operating control 22 in order to further raise the temperature of the compressed air, and the low pressure combustion chamber burner 26 is turned on. At about the same time the two by-pass valves 36 and 38 are gradually closed so that the exhaust from the high pressure turbine starts to operate the low pressure turbine, and the high pressure compressor driven by it starts to compress further the air discharged by the low pressure compressor. The heat exchanger 16 now becomes heated by the exhaust from the low pressure turbine, so the air from the compressors picks up heat in flowing through the regenerator. The result is that the turbines and compressors are driven faster and faster until they reach full speed at the maximum temperature for which the cycle is designed, assuming that it is desired to operate the plant at full load. For part load performance the low pressure turbine is slowed down by turning down the two burners 19 and 26.

With my invention it is possible to maintain a substantially constant temperature at all the turbines regardless of the load on the system. There may be a slight variation in temperature at the turbine driving the low pressure compressor, because the speed of that compressor is the principal variable determining the quantity of air taken into the system and some variation in temperature at the inlet of the turbine driving the low pressure compressor may be desirable in order to control the speed of the compressor. However, in the cycle disclosed herein any such temperature variation can be kept at a small value which is not significant relative to the amount of work that the turbine driving the low pressure compressor contributes to the whole plant. It is therefore true that this cycle is controlled, not by varying the temperature of the compressed air, but by varying the quantity of air flowing through the plant. It is not to be inferred, however, that with a constant temperature the heat drop does not change when the air flow is altered, because the turbines behave like orifices and the overall pressure ratio of the cycle will therefore vary with the air flow. The important point is that the control of this cycle is effected primarily through a variation in quantity of air, while the variation in pressure ratio is merely a consequence thereof.

The reason that the air flow in this cycle varies directly with the load is that the low pressure compressor is not driven by the low pressure turbine but by a turbine, the high pressure turbine in Fig. 1, that drives nothing else. Thus, the low pressure compressor is segregated from the rest of the system and operates at a speed independent of the speed of the power output turbine, which is the low pressure turbine. Moreover, both compressors are connected in series so that all of the air discharged by the low pressure compressor must pass through the high pressure compressor. As the speed of the high pressure turbine is controlled by regulating the burner in the high pressure combustion chamber, the speed of the low pressure compressor, which consumes all of the power produced by the high pressure turbine, is likewise controlled by that burner. It follows that the quantity of air taken in by the low pressure compressor, which depends primarily on the compressor's speed and is nearly the linear function thereof, is therefore dependent upon the amount of heat applied to the compressed air in front of the high pressure turbine. With less load there is less heat, and with less heat there is less air to be heated, so the temperature of that air does not change materially.

Regardless of the load on the system and the quantity of air flowing through it, the high pressure compressor will do only the amount of work required to raise the pressure of the air discharged by the low pressure compressor to the inlet pressure of the high pressure turbine. This is because the outlet pressure of the high pressure compressor is determined by the high pressure turbine's inlet pressure, which is fixed once the turbine is designed inasmuch as its flow characteristics are similar to those of an orifice, and the inlet pressure of the high pressure compressor is the discharge pressure of the low pressure compressor. The smaller this pressure ratio across the high pressure compressor, the less work the high pressure compressor has to do and the less power it will take from the low pressure turbine. In fact, if the inlet pressure of the high pressure turbine is low enough at part load, the high pressure compressor will do no work but merely rotate idly. In such a case, all of the power developed by the low pressure turbine will go into the propeller.

The inlet pressure of each turbine depends primarily on the weight of air flow to it, being approximately a linear function thereof. This pressure is slightly sensitive to turbine speed and to absolute temperature, however. The discharge pressure of the high pressure turbine is determined by the inlet pressure required by the low pressure turbine to pass the air. The discharge pressure of the low pressure turbine is about equal to atmospheric pressure at all times.

When positive displacement compressors are connected in series the pressure ratio built up by the low pressure compressor depends upon its volumetric displacement per revolution in relation to that of the high pressure compressor and upon the ratio of speeds of the two compressors. For example, if the capacity of the low pressure compressor at a given speed is 20 cubic feet of air a second, and the capacity of the high pressure compressor at the same time is 10 cubic feet a second, the low pressure compressor must compress each 20 cubic feet of air into 10 cubic feet. The pressure ratio of the low pressure compressor is therefore 1 to 2. If the speed of the high pressure compressor remains the same but the speed of the low pressure compressor is doubled, then the low pressure compressor draws in 40 cubic feet of air per second and must compress it into 10 cubic feet, giving a pressure ratio of 1 to 4. However, if, as will be explained below, the speed of the high pressure compressor in this example is increased whenever the low pressure compressor is speeded up, the capacity of the high pressure compressor at the higher speed would be greater than 10 cubic feet and the pressure ratio of the low pressure compressor would therefore be less than 1 to 4.

The cycle disclosed herein is particularly useful in conjunction with propellers, the speed and power of which are not independent of each other as they may be in the case of electric generators. On the contrary, the speed and power of a propeller are approximately related by the "cube law." That is, the power developed by a propeller is proportional to the cube of its speed. Thus, at twice the speed, approximately eight times the power is obtained; while at half speed, only about one-eighth the power is produced by the propeller. All of this means that when a propeller is driven, the speed of the high pressure compressor will be changed when a change in power at the propeller requires a change in speed of the low pressure compressor. The pressure ratio of the low pressure compressor therefor does not have to vary an undue amount.

Fig. 2 of the drawings shows this invention embodied in a plant in which there are three compressors, three turbines, and three combustion chambers. The compressors are arranged in series with one another and also in series with the three turbines before each of which there is a combustion chamber 50. The low pressure compressor 51 is driven through a shaft 52 from the intermediate turbine 53, while the other two compressors 54 and 55 are driven by a common shaft 56 from the high pressure turbine 57. The low pressure turbine 58 does not drive a compressor, but only a propeller 60 or other device which may also be driven from the high pressure turbine through suitable gearing 61. There are intercoolers 62 between the compressors, and a regenerator 63 between the high pressure compressor and the high pressure turbine for receiving heat from the exhaust gas from the low pressure turbine.

This cycle is controlled in the same manner as the first one, by controlling th combustion chamber burners. As the low pressure compressor is not driven by the low pressure turbine, but by a turbine that drives nothing else, the quantity of air flow varies directly with the load on propeller 60 while the temperature of that air remains substantially constant at the turbines. Although this cycle is preferred for three turbines, other arrangements and numbers of turbines and compressors can be employed as long as the low pressure compressor is segregated from the rest of the cycle by driving it from a turbine other than the low pressure turbine.

According to the provisions of the patent statues, I have explained the principle and operation of my invention and have illustrated and described what I now consider to represent its best embodiment. However, I desire to have it understood that, within the scope of the appended claims, the invention may be practiced otherwise than as specifically illustrated and described.

I claim:

1. A gas turbine power plant for variable loads, comprising a plurality of air compressors connected in series and including a low pressure compressor and a high pressure compressor, a plurality of turbines connected in series and including a power output low pressure turbine and a turbine operable at speeds independent of the speed of the low pressure turbine, power take-off means connected to said low pressure turbine, conduit means for conducting compressed air from said high pressure compressor to said turbines, a burner before each turbine for heating said compressed air, a drive operatively connecting each compressor with one of said turbines for driving the compressors, the low pressure compressor drive being connected only to said turbine that is operable at speeds independent of the speed of said low pressure turbine, and control means for controlling said burners to control the power developed by said low pressure turbine.

2. A gas turbine power plant for variable loads, comprising a high pressure turbine, a low pressure compressor driven thereby, a low pressure turbine, a high pressure compressor in series with the low pressure compressor and driven by the low pressure turbine, the low pressure turbine being adapted to furnish power in addition to that required for driving the high pressure compressor, power take-off means connected to said low pressure turbine, conduit means for conducting compressed air from the high pressure compressor to the high pressure turbine to drive the high pressure turbine, said conduit means being substantially free of air pressure increasing restrictions, whereby the compressed air is delivered to the high pressure turbine at substantially the same pressure it has when it leaves the high pressure compressor, conduit means for conducting substantially all of the compressed air from the high pressure turbine to the low pressure turbine to drive the latter turbine, burners before each turbine for heating said compressed air, and control means for controlling said burners to control the power developed by said low pressure turbine.

3. A gas turbine power plant for variable loads comprising a positive displacement rotary low pressure compressor and a positive displacement rotary high pressure compressor connected in series, a high pressure turbine and a low pressure turbine connected in series, a conduit connecting the high pressure compressor to the high pressure turbine, continuous combustion means before each turbine for heating compressed air delivered by the compressors, means for operatively connecting the high pressure turbine to the low pressure compressor, means for operatively connecting the low pressure turbine to the high pressure compressor, means carried by the low pressure turbine for operatively connecting it to a driven member outside of the plant itself, and means for controlling said heating means to control the speed of the low pressure compressor independently of the speed of the low pressure turbine.

4. A gas turbine power plant for variable loads comprising a high pressure turbine, a low pressure compressor driven thereby, a low pressure turbine, a high pressure compressor driven by the low pressure turbine, the low pressure turbine being adapted to furnish power in addition to that required for driving the high pressure compressor, power take-off means connected to said low pressure turbine, a conduit connecting the two compressors, a second conduit connecting the high pressure compressor to the high pressure turbine, a third conduit connecting the two turbines, a fuel burner projecting into the second conduit for heating compressed air flowing therethrough, another fuel burner projecting into the third conduit for heating compressed air flowing therethrough, and means for controlling said burners to control the power developed by the plant.

5. A gas turbine power plant for variable loads comprising a high pressure turbine, a low pressure compressor driven thereby, a low pressure turbine, a high pressure compressor driven by the low pressure turbine, a low pressure turbine being adapted to furnish power in addition to that required for driving the high pressure compressor, power take-off means connected to said low pressure turbine, a conduit connecting the two compressors, a second conduit connecting the high pressure compressor to the high pressure turbine, a third conduit connecting the two turbines, a heat exchanger in the second conduit, a fourth conduit connecting the outlet of the low pressure turbine to said heat exchanger, a fuel burner for heating compressed air flowing through the second conduit, another fuel burner between said turbines for heating compressed air flowing through the third conduit, and means for controlling said burners to control the power developed by the plant.

6. A gas turbine power plant for variable loads comprising a low pressure compressor and an intermediate pressure compressor and a high pressure compressor connected in series, a high pressure turbine and an intermediate pressure turbine and a low pressure turbine connected in series, a conduit connecting the high pressure compressor to the high pressure turbine, means before each turbine for heating compressed air delivered by the compressors, means for operatively connecting the intermediate pressure turbine to the low pressure compressor, means for operatively connecting at least one of the remaining turbines to the intermediate pressure compressor and the high pressure compressor, and means carried by at least one of said remaining turbines for operatively connecting it to a driven member.

7. A gas turbine power plant for variable loads comprising a low pressure compressor and an intermediate pressure compressor and a high pressure compressor connected in series, a high pressure turbine and an intermediate pressure turbine and a low pressure turbine connected in series, a conduit connecting the high pressure compressor to the high pressure turbine, means before each turbine for heating compressed air delivered by the compressors, means for operatively connecting the intermediate pressure turbine to the low pressure compressor, means for operatively connecting the high pressure turbine to the intermediate pressure compressor and the high pressure compressor, and means for operatively connecting the low pressure turbine and the high pressure turbine to a driven member.

8. A gas turbine power plant for variable loads comprising a low pressure compressor and an intermediate pressure compressor and a high pressure compressor connected in series, a high pressure turbine and an intermediate pressure turbine and a low pressure turbine connected in series, a conduit connecting the high pressure compressor to the high pressure turbine, means before each turbine for heating compressed air delivered by the compressors, means for operatively connecting the intermediate pressure turbine to the low pressure compressor, means for operatively connecting the intermediate pressure compressor and the high pressure compressor as a unit to the high pressure turbine, and gearing for operatively connecting the high pressure turbine and the low pressure turbine as a unit to a driven member outside the plant.

RONALD B. SMITH.

REFERENCES CITED

The following references are of record in the file of this patent:

UNITED STATES PATENTS

| Number | Name | Date |
|---|---|---|
| 2,073,191 | Belluzo | Mar. 9, 1937 |
| 2,306,277 | Oswald | Dec. 22, 1942 |
| 1,959,795 | Lysholm | May 22, 1934 |
| 2,095,991 | Lysholm | Oct. 19, 1937 |